United States Patent Office 2,822,353
Patented Feb. 4, 1958

2,822,353

VULCANIZABLE RUBBER COMPOSITION AND PROCESS

Ralph A. Bankert and Walter S. Ropp, Wilmington, Del., assignors to Hercules Powder Company, Wilmington, Del., a corporation of Delaware No Drawing. Application October 12, 1955
Serial No. 540,162

7 Claims. (Cl. 260—82.1)

This invention relates to the art of rubber compounding and more particularly to an improved rubber composition.

The rubber industry depends almost entirely upon sulfur or sulfur-bearing materials as vulcanization agents. The vulcanization of rubber in the presence of sulfur is easily controlled and there has been a steady improvement in both the rate of curing and the quality of vulcanized products produced. This is due in part to the development of modern accelerators, activators, and other additives which are used in conjunction with sulfur for vulcanizing rubber. In addition to sulfur, selenium and tellurium have been used as vulcanization agents and nitrobenzenes and organic peroxides have also been employed to some extent. With certain rubbers such as butyl rubber, red lead and p-quinone dioxime have been used as vulcanization agents.

Despite the fact that the art of vulcanizing rubber is well over one hundred years old, vulcanized rubber products from even the most modern and highly developed formulations, are unsatisfactory in certain respects. Sulfur vulcanized rubber, for example, is wanting in aging characteristics, that is, resistance to deterioration of its rubberlike properties and discoloration in the presence of oxygen or air, heat, and particularly in conjunction with sunlight. There has been a need in the art for a vulcanizing agent capable of producing vulcanized rubbers having the advantageous properties of sulfur-cured rubbers but without the disadvantageous properties.

In accordance with the present invention, a vulcanized rubber product is prepared by vulcanizing a composition comprising a rubber selected from the group consisting of natural rubber and butalastic polymers and from about 0.1% to about 10%, based on the weight of rubber, of a monoperoxyacetal of the formula $$CH_3-CH-OR$$
$$\phantom{CH_3-CH-}OR'$$

wherein R and R' are selected from the group consisting of saturated and aromatically unsaturated hydrocarbon radicals. The vulcanized product thus prepared is superior in many respects to vulcanized rubbers prepared using the vulcanizing agents most commonly employed in the art. In particular, the vulcanized products of the invention are superior to sulfur vulcanized rubbers in their resistance to deterioration upon aging in air or oxygen and particularly in the presence of heat and/or sunlight. The vulcanization process is distinguished by a fast rate of cure and the ability of the composition to withstand considerable overcuring without ill effects, the latter being indicative of the resistance to aging at high temperature which is possessed by the vulcanizates.

The following examples illustrate specific embodiments of the invention and show the effectiveness of the specified monoperoxyacetal vulcanizing agents in the process of the invention. All parts and percentages are by weight unless otherwise specified.

EXAMPLES 1 AND 2

Rubber compositions were prepared containing the ingredients in the proportions indicated in Table I. The compositions were made by first preparing a masterbatch containing 1200 parts butadiene-styrene copolymer (general purpose cold rubber designated as GR-1500) and 600 parts of furnace black (Philblack "0"). The filler was incorporated into the rubber by thorough mixing on a standard two-roll rubber mill, the rolls being maintained at a temperature of 80–110° F. The polymer was first allowed to form a band on the front roll and the furnace black added as fast as practicable. The blend was then cross-cut and end-rolled about 6 times each and the rubber composition removed. Portions of the finished masterbatch were weighed out and the monoperoxyacetals specified in the following table were added to the various portions of masterbatch in the amounts shown. The monoperoxyacetals were incorporated into the rubber composition in the same manner that the furnace black was incorporated, i. e., by end-rolling and cross-cutting about 6 times. The compounded sheet was then allowed to stand at room temperature and then put back on the roll with a free rolling nip for several minutes to establish the mill direction after which it was sheeted from the mill at a thickness of about 0.085 inch. The sheet thus prepared was allowed to stand overnight and then refined by 6 passes through tight rolls.

*Table I*

| | Composition (parts) | |
|---|---|---|
| | Example 1 | Example 2 |
| GR-S 1500 | 100 | 100 |
| Furnace Black | 50 | 50 |
| 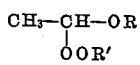<br>O O-p-menthyl | 1 2 | |
| CH₃CHO-dihydro-α-terpinyl<br>\|<br>O O-α-cumyl | | 1 2.45 |

¹ Parts are on active peroxide basis.

The compositions were next vulcanized in a closed multiple cavity mold to form sheets 6 inches square and 0.075 inch in thickness. These sheets were cured at 300° F. Table II presents physical property data on unaged specimens obtained by standard ASTM methods using ASTM type "C" dumbell speciments in the tensile strength and elongation tests.

*Table II*

|  | Cure Time, Min. at 300° F. | Composition of— | |
|---|---|---|---|
|  |  | Example 1 | Example 2 |
| Mooney Scorch—MS Rotor, Min. to 10-Point Rise at 250° F | | 11 | 13 |
| Modulus at 300% Elongation, p. s. i | 7½ | 1,865 | 1,290 |
|  | 15 | 1,935 | 1,885 |
|  | 30 | 2,020 | 2,045 |
|  | 45 | 2,000 | 1,940 |
|  | 60 | 1,920 | 1,920 |
|  | 90 | 1,865 | 2,025 |
| Tensile Strength, p. s. i | 7½ | 2,970 | 2,910 |
|  | 15 | 3,120 | 3,040 |
|  | 30 | 3,110 | 2,890 |
|  | 45 | 3,150 | 3,010 |
|  | 60 | 3,200 | 2,930 |
|  | 90 | 3,030 | 2,920 |
| Elongation, Percent | 7½ | 430 | 530 |
|  | 15 | 420 | 420 |
|  | 30 | 405 | 390 |
|  | 45 | 420 | 400 |
|  | 60 | 430 | 400 |
|  | 90 | 420 | 390 |
| Shore A2 Hardness | 7½ | 57 | 53 |
|  | 15 | 56 | 56 |
|  | 30 | 57 | 57 |
|  | 45 | 58 | 57 |
|  | 60 | 58 | 57 |
|  | 90 | 58 | 57 |
| Bashore Resilience | 7½ | 46 | 47 |
|  | 15 | 46 | 48 |
|  | 30 | 46 | 46 |
|  | 45 | 46 | 46 |
|  | 60 | 46 | 48 |
|  | 90 | 46 | 47 |
| Time, Min. To Reach Optimum | | 5 to 7½ | 15 |

EXAMPLES 3, 4, 5, 6, 7, 8, AND 9

Following the procedure described in Examples 1 and 2, several rubber compositions were prepared from 100 parts of natural rubber, 50 parts of furnace black, and one of the following monoperoxyacetals in the amount indicated:

*Table III*

| Example | Peroxide | Parts Active Peroxide |
|---|---|---|
| 3 | $CH_3-CH-O\text{-dihydro-}\alpha\text{-terpinyl}$<br>$\phantom{CH_3-CH}OO\text{-}\alpha\text{-cumyl}$ | 2.15 |
| 4 | $CH_3-CH-O\text{-dihydro-}\alpha\text{-terpinyl}$<br>$\phantom{CH_3-CH}OO\text{-p-menthyl}$ | 2.26 |
| 5 | $CH_3-CH-O-C_2H_5$<br>$\phantom{CH_3-CH}OO\text{-}\alpha\text{-cumyl}$ | 1.45 |
| 6 | $CH_3-CH-O-C_2H_5$<br>$\phantom{CH_3-CH}OO\text{-p-menthyl}$ | 1.55 |
| 7 | $CH_3-CH-O\text{-isobutyl}$<br>$\phantom{CH_3-CH}OO\text{-}\alpha\text{-cumyl}$ | 1.63 |
| 8 | $CH_3-CH-O\text{-isobutyl}$<br>$\phantom{CH_3-CH}OO\text{-p-menthyl}$ | 1.75 |
| 9 | $CH_3-CH-O\text{-n-butyl}$<br>$\phantom{CH_3-CH}OO\text{-p-menthyl}$ | 1.75 |

The compositions were next vulcanized following the procedure outlined in Examples 1 and 2 and the following physical property data were obtained:

*Table IV*

| | Cure Time in min. at 300° F. | Example 3 | Example 4 | Example 5 | Example 6 | Example 7 | Example 8 | Example 9 |
|---|---|---|---|---|---|---|---|---|
| Mooney scorch, min. to 10-point rise at 250° F | | 20 | 13 | 20 | 23.5 | 18 | 13.5 | 11.5 |
| Modulus at 300% (p. s. i.) | 15 | 1,480 | 1,225 | 1,250 | 1,120 | 1,410 | 1,100 | 1,260 |
|  | 30 | 1,690 | 1,200 | 1,240 | 1,140 | 1,450 | 1,190 | 1,200 |
|  | 45 | 1,750 | 1,180 | 1,300 | 1,090 | 1,470 | 1,210 | 1,200 |
|  | 60 | 1,750 | 1,200 | 1,220 | 1,000 | 1,520 | 1,160 | 1,220 |
|  | 90 | 1,850 | 1,210 | 1,260 | 1,130 | 1,460 | 1,160 | 1,220 |
| Tensile strength (p. s. i.) | 15 | 2,350 | 2,210 | 2,070 | 1,850 | 2,360 | 2,050 | 2,040 |
|  | 30 | 2,400 | 2,200 | 1,960 | 1,820 | 2,150 | 1,910 | 2,130 |
|  | 45 | 2,300 | 2,040 | 2,130 | 1,890 | 2,130 | 1,970 | 2,040 |
|  | 60 | 2,370 | 2,050 | 1,990 | 1,870 | 2,200 | 2,080 | 2,060 |
|  | 90 | 2,370 | 2,070 | 2,040 | 1,810 | 2,120 | 2,420 | 2,100 |
| Percent Elongation at break | 15 | 400 | 430 | 410 | 415 | 400 | 430 | 390 |
|  | 30 | 380 | 430 | 395 | 400 | 390 | 400 | 420 |
|  | 45 | 370 | 410 | 420 | 420 | 375 | 410 | 410 |
|  | 60 | 370 | 410 | 400 | 440 | 385 | 425 | 355 |
|  | 90 | 360 | 420 | 410 | 410 | 380 | 425 | 420 |
| Shore "A2" hardness | 15 | 42.5 | 38 | 39 | 38 | 42 | 37.5 | 38 |
|  | 30 | 44.5 | 38.5 | 41 | 38 | 42.5 | 38.5 | 39 |
|  | 45 | 44.5 | 38.5 | 37 | 38.5 | 42.5 | 37 | 38.5 |
|  | 60 | 44.5 | 37.5 | 39.5 | 36.5 | 41 | 37 | 37.5 |
|  | 90 | 45.5 | 38 | 40 | 37.5 | 42.5 | 37.5 | 39.5 |
| Bashore resilience | 15 | 46 | 47 | 47 | 43 | 44 | 45 | 46 |
|  | 30 | 46 | 47 | 44 | 42 | 45 | 43 | 45 |
|  | 45 | 46 | 47 | 49 | 42 | 46 | 44 | 44 |
|  | 60 | 45 | 47 | 45 | 41 | 46 | 46 | 46 |
|  | 90 | 45 | 47 | 47 | 42 | 46 | 43 | 45 |

EXAMPLES 10, 11, 12, 13, 14, AND 15

Following the procedure described in Examples 1 and 2, several compositions were prepared each from 100 parts GR–S 1500, 50 parts furnace black, and one of the monoperoxyacetals in the amount indicated in the following table:

Table V

| Example | Peroxide | Parts Active Peroxide |
|---|---|---|
| 10 | $CH_3$—CH—O-dihydro-α-terpinyl<br>       OO-α-cumyl | 1.84 |
| 11 | $CH_3$—CH—O-dihydro-α-terpinyl<br>       OO-p-menthyl | 1.93 |
| 12 | $CH_3$—CH—O—$C_2H_5$<br>       OO-p-menthyl | 1.33 |
| 13 | $CH_3$—CH—O-isobutyl<br>       OO-α-cumyl | 1.40 |
| 14 | $CH_3$—CH—O-isobutyl<br>       OO-p-menthyl | 1.50 |
| 15 | $CH_3$—CH—O-n-butyl<br>       OO-p-menthyl | 1.50 |

The compositions were next vulcanized following the procedure outlined in Examples 1 and 2 and the following physical property data were obtained:

Table VI

| | Cure Time in min. at 300° F. | Example 10 | Example 11 | Example 12 | Example 13 | Example 14 | Example 15 |
|---|---|---|---|---|---|---|---|
| Modulus at 300% (p. s. i.) | 15 | 1,225 | 1,240 | 920 | 815 | 820 | 1,040 |
| | 30 | 1,325 | 1,250 | 960 | 845 | 820 | 1,000 |
| | 45 | 1,325 | 1,290 | 950 | 830 | 875 | 1,110 |
| | 60 | 1,375 | 1,325 | 970 | 800 | 985 | 1,070 |
| | 90 | 1,320 | 1,200 | 1,060 | 760 | 915 | 1,015 |
| Tensile strength (p. s. i.) | 15 | 2,730 | 2,760 | 2,580 | 2,290 | 2,400 | 2,590 |
| | 30 | 2,870 | 2,820 | 2,450 | 2,130 | 2,360 | 2,590 |
| | 45 | 2,790 | 2,880 | 2,570 | 2,230 | 2,500 | 2,690 |
| | 60 | 2,790 | 2,830 | 2,530 | 2,250 | 2,520 | 2,570 |
| | 90 | 2,780 | 2,800 | 2,560 | 2,310 | 2,560 | 2,650 |
| Percent Elongation at break | 15 | 520 | 520 | 590 | 610 | 550 | 530 |
| | 30 | 520 | 510 | 550 | 580 | 570 | 570 |
| | 45 | 490 | 520 | 570 | 590 | 580 | 530 |
| | 60 | 490 | 505 | 560 | 590 | 560 | 530 |
| | 90 | 500 | 515 | 550 | 600 | 580 | 540 |
| Shore "A2" hardness | 15 | 50.5 | 52 | 49.5 | 50 | 49.5 | 50 |
| | 30 | 52 | 52 | 50 | 50 | 49 | 48 |
| | 45 | 52.5 | 51.5 | 50 | 47.5 | 48.5 | 50 |
| | 60 | 53 | 52 | 49.5 | 49 | 50.5 | 52.5 |
| | 90 | 53 | 51.5 | 50.5 | 48 | 50 | 51 |
| Bashore resilience | 15 | 50 | 50 | 47 | 48 | 49 | 48 |
| | 30 | 49 | 50 | 46 | 48 | 49 | 47 |
| | 45 | 49 | 49 | 48 | 49 | 49 | 48 |
| | 60 | 49 | 49 | 48 | 48 | 49 | 48 |
| | 90 | 49 | 46 | 48 | 48 | 48 | 49 |

It is evident from the data in the table that the compositions withstood many minutes of overcure without detrimental effects. This is indicative of the outstanding heat stability possessed by the vulcanized compositions.

EXAMPLES 16 AND 17

Following the procedure described in Examples 1 and 2, several compositions were prepared each including 100 parts Buna N rubber (70% butadiene—30% acrylonitrile copolymer), 50 parts furnace black, and one of the monoperoxyacetals in the amount indicated in the following table:

Table VII

| Example | Peroxide | Parts Active Peroxide |
|---|---|---|
| 16 | $CH_3$—CH—O-dihydro-α-terpinyl<br>       OO-α-cumyl | 1.84 |
| 17 | $CH_3$—CH—O-dihydro-α-terpinyl<br>       OO-p-menthyl | 1.93 |

The compositions were next vulcanized following the procedure outlined in Examples 1 and 2 and the following physical property data were obtained:

Table VIII

| | Cure Time in min. at 300° F. | Example 16 | Example 17 |
|---|---|---|---|
| Mooney scorch, min. to a 10-point rise at 250° F. | | 30 | 10 |
| Modulus at 300% elongation (p. s. i.) | 15 | 910 | 1,020 |
| | 30 | 1,180 | 1,300 |
| | 45 | 1,150 | 1,260 |
| | 60 | 1,210 | 1,350 |
| | 90 | 1,280 | 1,575 |
| Tensile strength (p. s. i.) | 15 | 1,580 | 1,940 |
| | 30 | 1,890 | 2,210 |
| | 45 | 1,960 | 2,290 |
| | 60 | 2,000 | 2,290 |
| | 90 | 2,000 | 2,530 |
| Percent Elongation at break | 15 | 455 | 460 |
| | 30 | 420 | 440 |
| | 45 | 430 | 440 |
| | 60 | 430 | 420 |
| | 90 | 410 | 430 |
| Shore "A2" hardness | 15 | 48 | 48 |
| | 30 | 50.5 | 48.5 |
| | 45 | 50 | 49.5 |
| | 60 | 49 | 50 |
| | 90 | 50.5 | 53.5 |
| Bashore resilience | 15 | 36 | 36 |
| | 30 | 37 | 36 |
| | 45 | 37 | 36 |
| | 60 | 36 | 37 |
| | 90 | 36 | 36 |

It is evident from the physical property data in the preceding tables that all the compositions withstood many minutes of overcure without detrimental effects. This is indicative of the outstanding heat stability possessed by the vulcanized compositions.

The monoperoxyacetals utilized in preparing the compositions of the invention and in the process of the invention have the structural formula

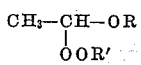

wherein R and R' are selected from the group consisting of saturated and aromatically unsaturated hydrocarbon radicals. These compounds are obtainable by the reaction of a vinyl ether of the formula $CH_2$=CHOR and a hydroperoxide of the formula R'OOH, wherein R and R' are as defined as above. The reaction is catalyzed by an acid-acting condensation catalyst. The following examples illustrate the preparation of typical monoperoxyacetals within the scope of the above formula.

EXAMPLE A

To a solution of 21.8 parts 95% dihydroterpinyl vinyl ether and 18.2 parts 97% cumene hydroperoxide in 360 parts dry benzene cooled to 19° C. in a water bath was added about 0.2 part by weight gaseous boron trifluoride. The temperature rose gradually to 28° C. during the addition of the boron trifluoride. After about 10 minutes, the reaction mixture was washed with an equal volume of 5% aqueous sodium hydroxide solution in four portions and then with an equal volume of water in three portions. The benzene was evaporated under reduced pressure with a nitrogen sparge. The residue amounting to 34.4 parts analyzed 0% cumene hydroperoxide and 89% α-dihydroterpinylethyl α-cumyl peroxide corresponding to the formula

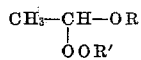

where R is dihydroterpinyl and R' is α-cumyl.

The method of an analysis for the total peroxy compounds was essentially that of Wagner, Smith and Peters, Analytical Chemistry 19, 976–9 (1947) in which iodine liberated from sodium iodide is titrated, with the modification in that concentrated hydrochloric acid was added to hydrolyze the acetal so that all of the peroxy compounds reacted with the sodium iodide with liberation of titratable iodine. Cumene hydroperoxide was determined polarographically. The percent peroxyacetal was determined by the difference between total peroxide and cumene hydroperoxide.

EXAMPLE B

To a solution of 14.4 parts vinyl ethyl ether and 40.6 parts 74.9% cumene hydroperoxide in 600 parts dry benzene cooled to 3° C. in an ice bath was added about 0.1 part boron trifluoride. The temperature rose spontaneously to 16° C. and then gradually fell to about 3° C. After 5–10 minutes total reaction time, the solution was washed with an equal volume of 5% sodium hydroxiode in four portions and then with an equal volume of water in five portions. The solvent was stripped off under reduced pressure with a nitrogen sparge. The product remaining as a benzene-free residue amounted to 49.3 parts. Its analysis showed 3.15% cumene hydroperoxide by polarographic analysis and 87.5% of the peroxyacetal of the formula

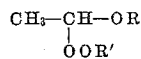

in which R is ethyl and R' is α-cumyl by using the difference between total peroxides and cumene hydroperoxide by polarographic analysis.

EXAMPLE C

Example B was repeated using 62.7 parts 47.7% p-menthane hydroperoxide and 20 parts isobutyl vinyl ether. The yield of product was 67.5 parts analyzing 61.2% of a product of the formula

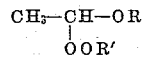

where R is isobutyl and R' is p-menthyl.

EXAMPLE D

To a solution of 20 parts isobutyl vinyl ether and 40.6 parts 74.9% cumene hydroperoxide in 600 parts benzene at 25° C. was added 0.4 part p-toluene sulfonic acid monohydrate. The temperature immediately began to rise and reached 30° C. in one minute at which temperature it was maintained by use of an ice bath. After 10 minutes, when the reaction was complete, the mixture was washed with 200 parts 5% sodium hydroxide solution in two portions and then with 300 parts water in three portions. The benzene was stripped off under reduced pressure with a nitrogen sparge leaving a benzene-free residue of 56.4 parts. This residue was shown by analysis to contain 92.1% of a peroxyacetal of the formula

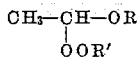

wherein R is isobutyl and R' is α-cumyl.

EXAMPLE E

Following the general procedure outlined in the preceding examples, three additional monoperoxyacetals were prepared from p-menthane hydroperoxide and dihydroterpinyl vinyl ether, vinyl ethyl ether, and n-butyl vinyl ether, respectively. This led to products containing 60.3%, 58.7%, and 56.7% monoperoxyacetals, respectively.

Typical hydroperoxides which are useful reactants for preparing the monoperoxyacetals are exemplified by cumene hydroperoxide, p-cymene hydroperoxide, p-diisopropylbenzene hydroperoxide, 1-phenylcyclohexyl hydroperoxide, p-menthane hydroperoxide (a mixture of isomeric hydroperoxides resulting from the replacement of hydrogens attached to the tertiary carbon atoms of p-menthane with hydroperoxy groups—obtainable by air oxidation of p-menthane), isopropylnaphthalene hydroperoxide, 1-methylcyclohexyl hydroperoxide-1, pinane hydroperoxide, t-butyl hydroperoxide, and t-amyl hydroperoxide. Typical vinyl ethers which are useful reactants for preparing the monoperoxyacetals are exemplified by dihydro-α-terpinyl vinyl ether, bornyl vinyl ether, isobornyl vinyl ether, fenchyl vinyl ether, dehydroabietyl vinyl ether, cyclohexyl vinyl ether, 1-methylcyclohexyl vinyl ether, methyl vinyl ether, ethyl vinyl ether, n-propyl vinyl ether, isopropyl vinyl ether, n-butyl vinyl ether, isobutyl vinyl ether, t-butyl vinyl ether, stearyl vinyl ether, and phenyl vinyl ether.

The acid-acting condensation catalysts which are useful in preparing the monoperoxyacetals are well known in the art and include the mineral acids, Friedel-Crafts type catalysts, acid clays, and organic sulfonic acids. While any of these catalysts is useful with most of the hydroperoxides, the organic sulfonic acids and boron trifluoride are preferred for use with α-aryl hydroperoxides. The amount of catalyst is preferably the minimum that is sufficient to catalyze the reaction. A catalytic amount will generally lie in the range of about 0.5% to 5% of the reaction mixture.

The reaction is carried out in nonaqueous media to avoid hydrolysis of the product. An inert solvent such as benzene or hexane is advantageously employed to facilitate control of the reaction. Other solvents which are useful in Friedel-Crafts reactions also are useful in preparing the monoperoxyacetals. Recovery of the peroxide is conveniently accomplished by neutralizing the catalyst with alkali and stripping off the solvent.

The condensation reaction between the hydroperoxide and the vinyl ether takes place readily at room temperature. A preferred temperature is from about 0° C. to about 30° C. Temperatures above about 80° C. accelerate decomposition of the product and can be used successfully only by carrying out the process with very short contact time.

The monoperoxyacetals are essentially nonvolatile compounds, i. e., they have a vapor pressure sufficiently low at rubber compounding and vulcanization temperatures to prevent substantial loss by volatilization during compounding and vulcanization. The monoperoxyacetals decompose at a moderate rate under vulcanization conditions to form free radicals and this decomposition is almost entirely dependent upon temperature. A particularly advantageous characteristic of the monoperoxyacetals is reasonable stability during rubber compounding coupled with reactivity during vulcanization.

The quantity of monoperoxyacetal to be utilized in preparing the rubber compositions of the invention will depend to a large extent upon the conditions to be employed during vulcanization. In general, the quantity may vary from about 0.1% to 10% based on the weight of rubber. A preferred amount is from about 0.25% to about 7.5%. The amount can also vary depending upon the type of rubber, the nature of the composition, and the properties desired in the final product. The compounding of rubber and the vulcanization thereof are well known and the same manipulative techniques may be utilized in practicing this invention. However, utilizing the formulation of rubber compositions in accordance with the invention will generally be simpler than in the prior art because certain ingredients vitally necessary for sulfur vulcanization are unnecessary. In this invention, a vulcanizing temperature of from about 260 to 350° F. is practical with a temperature from about 300 to 320° F. being preferred.

The examples have shown the use of various monoperoxyacetals as rubber vulcanization agents and have illustrated the vulcanization of GR-S, Buna N, and natural rubber. The invention is applicable not only to these rubbers but to other synthetic rubbers designated in the art as butalastic polymers. More specifically butalastic polymers are defined by Marchionna [Marchionna, "Butalastic Polymers," Reinhold (1946)] as synthetic, elastic polymers of a butadiene compound with or without other compounds polymerizable therewith.

The process of the invention can be applied, for example, to synthetic butalastic polymers such as those prepared by polymerizing diolefins, halogenated derivatives of diolefins or other substituted diolefins, or by copolymerizing diolefins with other compounds containing vinyl groups such as styrene, acrylic acid esters, and acrylic acid nitrile. More particularly, the butalastic polymers may be those obtained by polymerizing any conjugated diolefin such as isoprene, dimethyl butadiene and chloroprene or by copolymerizing isoprene and styrene or isoprene and acrylonitrile. The process of the invention is particularly applicable to GR-S, both hot and cold rubbers, Buna N and natural rubber. In utilizing this invention, suitable fillers, reinforcing agents, antioxidants, vulcanizers, extenders, plasticizers, softeners, processing aids, as well as other activators and accelerators well known in the preparation of natural rubber and synthetic rubber compositions, can be employed in accordance with this invention. Certain materials when utilized in conjunction with the monoperoxyacetals produce vulcanized rubber products with greater hardness. Utilizing such materials, a given amount of cure can be obtained using less peroxide than would be necessary in the absence of these materials. Materials which act to produce vulcanizates of higher hardness include furnace black, diphenyl guanidine, hexamethylenetetramine, hydrated lime, certain rosin soaps, such as heat-treated rosin soaps, sodium hydroxide, triethanolamine, etc.

Zinc oxide, reinforcing grades of carbon black, and the like can be employed as reinforcing agents. Preferably, a mixture of suitable fillers and reinforcing agents is employed to give to the compositions the particular properties which may be desired. Thus, a mixture of zinc oxide and carbon black can be employed. Suitable pigments, such as ultramarine, vermillion, or the like, can be employed to impart to the composition a desired color.

In general, because of the marked stability of the present compositions to the effects of exposure to the atmosphere, when vulcanized, the use of powerful antioxidants is not so essential as in the case of rubber compounded with sulfur. However, in the event that it is desirable further to decrease the effects of oxidation on the rubber, antioxidants can be added. Suitable antioxidants are, for example, diphenylamine, aldo-α-naphthylamine, diphenylethylene diamine, phenyl-α-naphthylamine, or phenyl-β-naphthylamine. In case a commercial synthetic rubber to which antioxidants normally are added during preparation is employed, the amount of antioxidant added during the compounding of the present compositions can be increased suitably. The use of the various fillers, antioxidants, and the like hereinbefore mentioned is well known, and one skilled in the art will have no difficulty in arriving at a formulation suitable for a particular need.

Vulcanized products prepared in accordance with the present invention are of particular value in any application where resistance to deterioration in the presence of heat, oxygen, or sunlight is important. Such vulcanizates are very valuable in the manufacture of automobile tires and will also be found useful in the manufacture of inner tubes, rubber hoses, rubber-lined hoses, foot wear, electrical insulator goods, molded rubber articles, and the like. The improved processing characteristics of the rubber compositions of this invention, that is, the resistance of such compositions to cure during milling, greatly improves and facilitates compounding procedures. The increased rate at which the rubber compositions will cure at customary curing temperatures serves to expedite compounding with consequent savings in time and labor. The improved characteristics of the vulcanized product are apparent in their increased resistance to discoloration, increased tensile strength, superior hysteresis and electrical properties, increased resistance to oxidation, and increased resistance to embrittlement on aging.

What we claim and desire to protect by Letters Patent is:

1. A vulcanizable rubber composition comprising a rubber selected from the group consisting of natural rubber and synthetic, rubbery polymers of a compound selected from the group consisting of conjugated diolefins and chloroprene, and from about 0.1% to about 10%, based on the weight of rubber, of a monoperoxyacetal of the formula

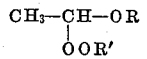

wherein R and R' are selected from the group consisting of saturated and aromatically unsaturated hydrocarbon radicals.

2. The composition of claim 1 in which R is dihydroterpinyl and R' is α-cumyl.

3. The composition of claim 1 in which R is ethyl and R' is α-cumyl.

4. The composition of claim 1 in which R is isobutyl and R' is p-menthyl.

5. The composition of claim 1 in which R is isobutyl and R' is α-cumyl.

6. The composition of claim 1 in which the rubber is natural rubber.

7. The composition of claim 1 in which the rubber is a synthetic, rubbery copolymer of butadiene and styrene.

References Cited in the file of this patent

UNITED STATES PATENTS

| | | |
|---|---|---|
| 2,442,330 | Fuller | June 1, 1948 |
| 2,695,328 | Kendall | Nov. 23, 1954 |